US012605014B2

(12) United States Patent
Lowes et al.

(10) Patent No.: US 12,605,014 B2
(45) Date of Patent: Apr. 21, 2026

(54) APPLIANCE HAVING A USER INTERFACE ADAPTIVE TO CHANGING POSITIONS

(71) Applicant: KENWOOD LIMITED, Havant (GB)

(72) Inventors: David Lowes, Havant (GB); Sam Davies, Havant (GB); Phil Shaw, Havant (GB)

(73) Assignee: KENWOOD LIMITED, Havant (GB)

( * ) Notice: Subject to any disclaimer, the term of this patent is extended or adjusted under 35 U.S.C. 154(b) by 954 days.

(21) Appl. No.: 17/625,130

(22) PCT Filed: Jun. 30, 2020

(86) PCT No.: PCT/GB2020/051574
§ 371 (c)(1),
(2) Date: Jan. 6, 2022

(87) PCT Pub. No.: WO2021/005333
PCT Pub. Date: Jan. 14, 2021

(65) Prior Publication Data
US 2022/0265092 A1      Aug. 25, 2022

(30) Foreign Application Priority Data

Jul. 10, 2019    (GB) ..................................... 1909923
Aug. 7, 2019    (LU) ....................................... 101341

(51) Int. Cl.
*A47J 43/07*          (2006.01)
*A47J 43/044*        (2006.01)
(Continued)

(52) U.S. Cl.
CPC ......... *A47J 43/0705* (2013.01); *A47J 43/044* (2013.01); *A47J 43/0755* (2013.01);
(Continued)

(58) Field of Classification Search
CPC .................... G06F 1/1637; G06F 9/451; A47J 2042/04481
See application file for complete search history.

(56) References Cited

U.S. PATENT DOCUMENTS 5,782,558 A * 7/1998 Roberts ................. A47J 43/044
                                                                366/331
2005/0091431 A1* 4/2005 Olodort ............... H04M 1/0245
                                                                710/72

(Continued)

FOREIGN PATENT DOCUMENTS

AU        2010101406 A4 * 1/2011    ............ A47J 43/044
AU        2012216404 B2      2/2016
(Continued)

OTHER PUBLICATIONS

GB Examination Report of the Intellectual Property Office issued in Application No. GB1909923.3, dated Jan. 10, 2023 (3 pages).
(Continued)

*Primary Examiner* — Claire X Wang
*Assistant Examiner* — Patrick M Mccarty
(74) *Attorney, Agent, or Firm* — Harness, Dickey & Pierce, P.L.C.

(57) ABSTRACT

An appliance comprises a component having a user interface. The appliance is arranged to control a feature of the user interface in dependence on a change in the position (such as a locational or rotational position) of the component.

19 Claims, 7 Drawing Sheets

(51) Int. Cl.
G06F 1/16            (2006.01)
G06F 9/451           (2018.01)

(52) U.S. Cl.
CPC ............ G06F 1/1637 (2013.01); G06F 9/451
(2018.02); A47J 2043/04481 (2013.01)

(56)               References Cited

U.S. PATENT DOCUMENTS

| | | | |
|---|---|---|---|
| 2006/0005580 A1 | 1/2006 | Espiard et al. | |
| 2007/0030758 A1* | 2/2007 | Lim ........................ | B01F 29/83 |
| | | | 366/222 |
| 2011/0186668 A1* | 8/2011 | Seidler .................. | A47J 27/004 |
| | | | 241/98 |
| 2011/0190034 A1 | 8/2011 | Shin | |
| 2012/0006767 A1 | 1/2012 | Bennett et al. | |
| 2014/0050045 A1* | 2/2014 | Hoare .................... | A23G 9/224 |
| | | | 62/340 |
| 2018/0217634 A1 | 8/2018 | Buckby | |

FOREIGN PATENT DOCUMENTS

| | | | |
|---|---|---|---|
| CN | 101952787 | A | 1/2011 |
| CN | 206413304 | U | 8/2017 |
| CN | 108292143 | A | 7/2018 |
| WO | WO-2018234927 | A1 | 12/2018 |

OTHER PUBLICATIONS

Amazon webpage—ATUMTEK Selfie Stick Tripod GB1909923.3, dated Jan. 6, 2023 (7 pages).
International Search Report and Written Opinion of the ISA issued in PCT/GB2020/051574, mailed Aug. 27, 2020; ISA/EP.
GB Search Report of the Intellectual Property Office issued in Application No. GB1909923.3, dated Jan. 8, 2020.
LU Search Report and Written Opinion of the Intellectual Property Office issued in Application No. LU101341, dated Feb. 19, 2020.
Notice of First Office Action for Application No. 2020800498877 (with English translation) dated Aug. 17, 2024 (14 pages).

\* cited by examiner

121b

121a

121

121b

121

121a

221a

221b

221a

221b

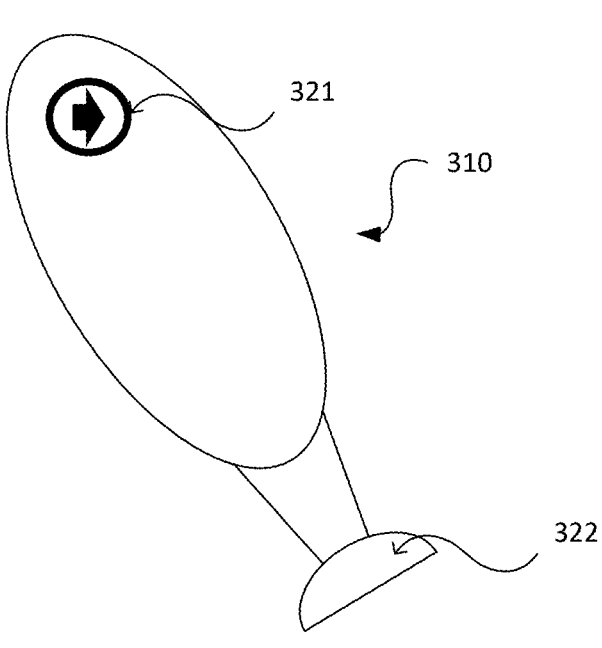
Figure 5a
321
310
322
Figure 5b
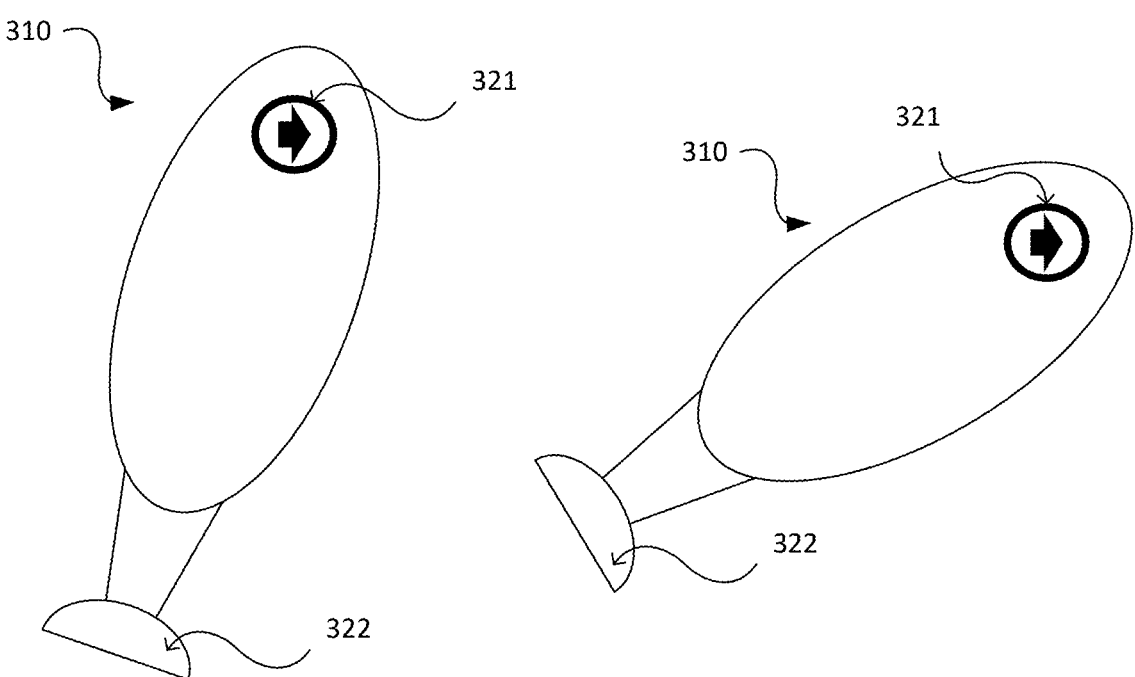
Figure 5c
Figure 5d

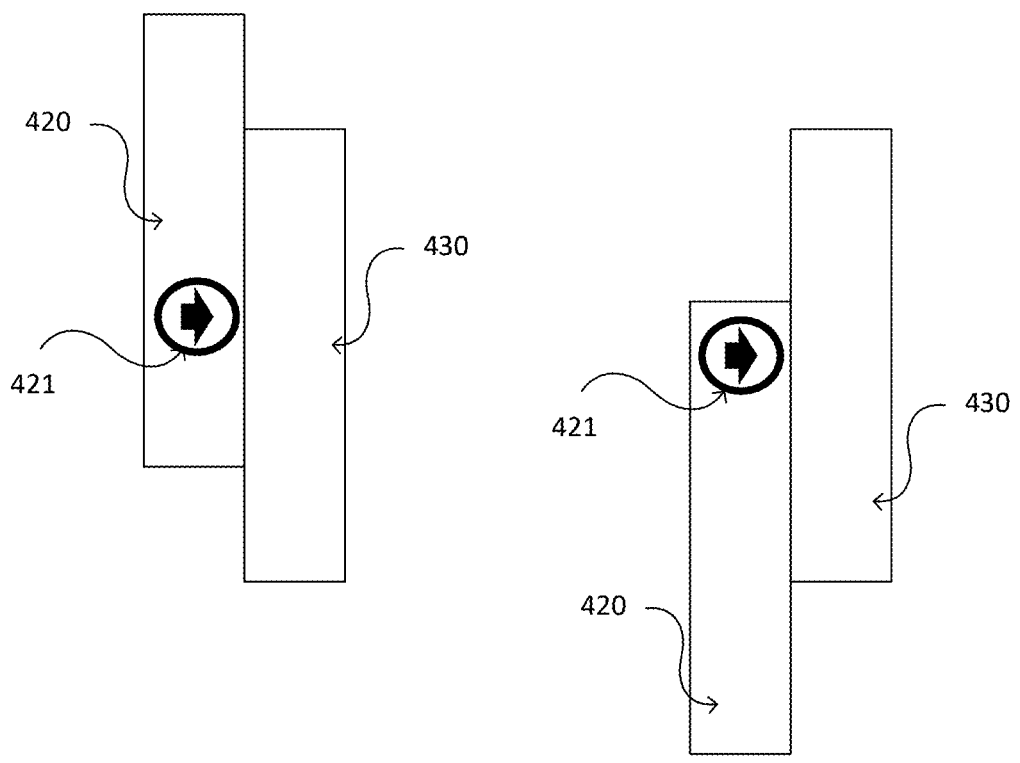
Figure 6a           Figure 6b
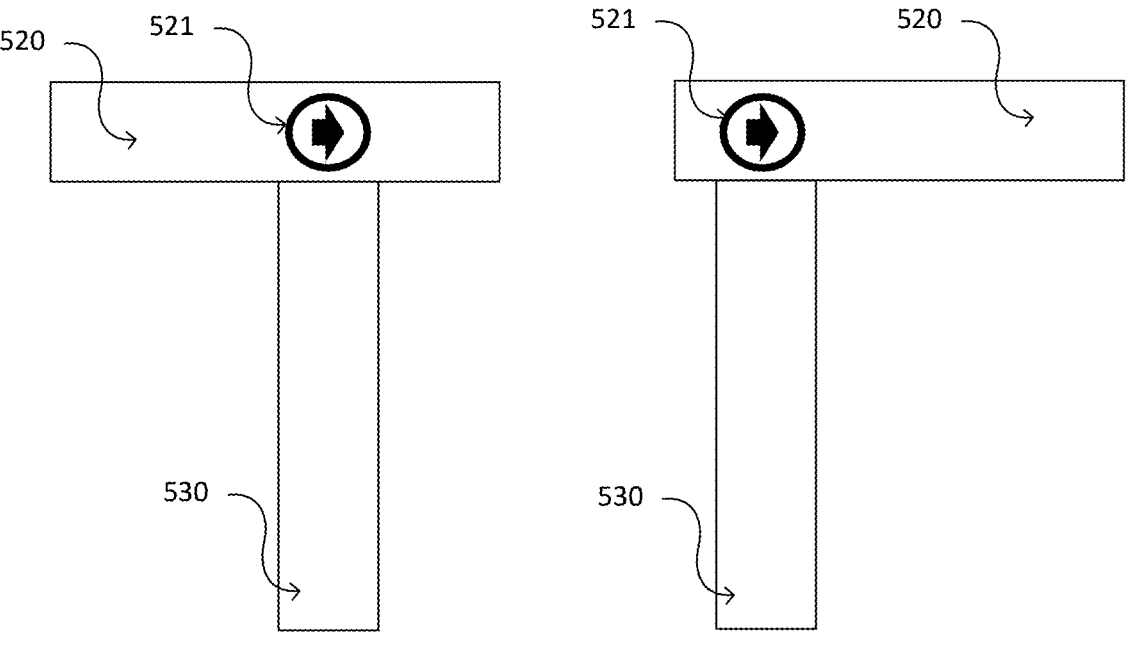
Figure 7a           Figure 7b

APPLIANCE HAVING A USER INTERFACE ADAPTIVE TO CHANGING POSITIONS

CROSS-REFERENCE TO RELATED APPLICATIONS

This application is a U.S. National Phase Application under 35 U.S.C. 371 of International Application No. PCT/GB2020/051574, filed Jun. 30, 2020, which claims the benefit of Great Britain Application No. 1909923.3, filed Jul. 10, 2019 and Luxembourg Application No. LU101341, filed Aug. 7, 2019. The entire disclosure of each of the above-identified applications is incorporated herein by reference.

FIELD OF THE INVENTION

This invention relates to an appliance with a user interface. Typically such appliances include a device or piece of equipment designed to perform a specific task. Such appliances may further include a drive mechanism (whether manual or electric or otherwise) for driving either an internal part of the appliance or the device or piece of equipment. Such appliances can also (or instead) include components movable relative to each other including the device or piece of equipment being movable relative to other components. In a preferred embodiment, the invention relates to a domestic appliance and/or a kitchen appliance, in particular a food processor such as a stand mixer.

BACKGROUND

An appliance is a device, machine, or piece of equipment designed to perform a specific task. A domestic appliance is an appliance used in the home to accomplish a household task, such as cooking, cleaning, or food preservation. To achieve the specific task, an appliance may comprise an implement, such as a tool, utensil, or other piece of equipment.

A stand mixer, for example the Kenwood Chef kitchen machine, is an appliance for mixing and preparing food and beverages. A stand mixer includes a casing which comprises a base (pedestal) and a head which extends overhead of the pedestal. The base is suitable for supporting a bowl. The head supports a downwardly facing drive outlet for driving one or more tools. For example, the drive outlet may drive a mixer tool to perform a planetary mixing action in a bowl supported by the base. The drive outlet is motor-driven. The casing is generally C-shaped.

Over the years, stand mixers have been adapted and developed so as to perform an ever broadening range of functions. Many stand mixers incorporate, for example, a plurality of drive outlets running at different speeds and with differing torque characteristics, enabling the appliances to perform a wide variety of operations (mixing, blending, whisking, beating, grinding, shredding etc.). Heating elements may be included in the bowl, the pedestal, or both the bowl and the pedestal and used to warm the bowl and cook its contents. Cooling elements may also be included in the bowl, the pedestal, or both the bowl and the pedestal and used to cool the bowl and its contents.

The head of the casing is movable relative to the remainder of the casing (and in particular relative to the bowl-supporting pedestal). Movement of the head of the casing relative to the remainder of the casing provides access to the pedestal and drive outlet so as to facilitate the insertion and removal of the mixing tools and the bowl.

Typically, movement of the head of the casing relative to the remainder of the casing is initiated by user-operation of a mechanical latch, which is actuated in order to release the head for pivoting motion upwards, away from the base, under the influence of a spring. However, the movement of the head part relative to the remainder of the casing may also be realised using an electric motor, pneumatic or hydraulic power, or by any other suitable means.

The present invention seeks to improve the versatility of such appliances.

According to at least one aspect of the present invention, there is disclosed an appliance, such as a domestic or kitchen appliance, comprising:

a component having a user interface such as a display, the component preferably being movable relative to at least one further component of the appliance;

wherein the appliance is arranged to control a feature of the user interface in dependence on a change in the position of the component, for example to maintain an orientation of the user interface relative to the further component.

This enables a user interface to be placed on a component of an appliance that would otherwise be unsuitable for a user interface, for example because it is relatively moveable, which enables the provision of user interfaces with increased visibility and accessibility. For example the component may be movable relative to the remainder of the appliance, or at least a further component such as a base of the appliance. The movement may be such that it changes the relative orientation of the component, such as a rotating movement.

Preferably, the appliance is arranged to control a position of the user interface relative to the component, for example by means of a controller. It should be understood that reference to a position of the interface includes an orientation of the interface.

Preferably, the appliance is arranged to change a position of the user interface. This enables a user interface to remain in a substantially constant position while the component moves, which improves visibility for a user.

Preferably, the appliance is arranged to control the position automatically in response to the change in the position of the component. This avoids the user needing to manually change the user interface, which may be difficult especially as users of appliances often have their hands full.

Preferably, the appliance is arranged to control the position based on a previous position of the user interface. Optionally, the appliance is arranged to control the position to return to a previous position.

Optionally, the appliance further comprises a sensor arranged to detect a position of and/or a movement of the component.

Optionally, the appliance is arranged to control the position in response to a signal from the sensor. The use of a sensor enables the user interface to identify a movement of the component and control the position accordingly (e.g. to rotate relative to the component to maintain an orientation).

Preferably, the component is arranged to rotate between an open position and a closed position. Preferably, each of the open position and the closed position are stable positions. Preferably, the component is secured in place at each of the open position and the closed position. For example the component may be a hinged component such as a head unit of a stand mixer.

Optionally, the appliance is arranged to control the position in dependence on a rotation of the component of less than 60 degrees, less than 40 degrees, less than 30 degrees, less than 15 degrees, and/or less than 10 degrees. This enables the user interface to respond to typical rotation ranges that may be found in appliances.

Preferably, the appliance is arranged to control the location and/or orientation of the user interface. Preferably, the appliance is arranged to maintain the position of the user interface.

Preferably the appliance is arranged to control the position of the user interface so that the orientation of the user interface changes by less than 50% of a movement range of the component, preferably less than 20% of the movement range, more preferably less than 5% of the movement range. The maximum movement range may, for example, be the movement range of the component between a closed position and an open position. Optionally, the movement range is a maximum movement range.

Preferably, the appliance is arranged to control the position of the user interface so that the orientation of the user interface changes by less than 10 degrees, preferably less than 5 degrees, more preferably less than 1 degree (for example as the component moves).

Optionally, maintaining a position comprises the appliance controlling the position of the user interface so that the location of the user interface changes by less than 100 centimetres, preferably less than 50 centimetres, more preferably less than 10 centimetres, more preferably less than 5 centimetres as the component moves.

Maintaining a position may comprise maintaining an absolute position (e.g. a position relative to the Earth) or may comprise maintaining a position relative to a further component of the appliance.

Preferably, the appliance is arranged to control the position relative after the component has moved, preferably once the component has finished moving.

Preferably, the appliance is arranged to control the position as the component moves and/or the appliance is arranged to control the position at or after movement of the component, preferably after the component has finished moving.

Preferably, the appliance is arranged to control the position in response to a trigger signal. This can avoid regular movement of the user interface, which may be undesirable and restrict movement to situations preceding probably or possible use of the user interface.

Optionally, the trigger signal is initiated based on at least one of: the component reaching a trigger position, preferably wherein the trigger position is an open position or a closed position; a locking sensor being activated; a time threshold being exceeded; a displacement being exceeded; and an orientation threshold being exceeded.

Optionally, the trigger signal is initiated based on a locking mechanism being operated. Preferably, the locking mechanism is arranged to selectively prevent movement and/or rotation of the component.

Optionally, the appliance is arranged to activate and/or deactivate one or more sections of the user interface.

Optionally, the appliance is arranged to activate a section of the user interface based on a change in the position of the component.

Optionally, one or more sections of the user interface are arranged to activate and/or deactivate in response to a change in the position of the component. Preferably, the appliance is arranged to activate a section of the user interface in dependence on a position of the component.

Preferably the appliance is arranged to control the position of the user interface so that the orientation of the user interface changes by less than 50% of a movement range of the component, preferably less than 20% of the movement range, more preferably less than 5% of the movement range. The maximum movement range may, for example, be the movement range of the component between a closed position and an open position. Optionally, the movement range is a maximum movement range.

Preferably, the appliance is arranged to control the position of the user interface so that the orientation of the user interface changes by less than 10 degrees, preferably less than 5 degrees, more preferably less than 1 degree (for example as the component moves).

Preferably, the appliance further comprises a further component, wherein the appliance is arranged to control the position of the user interface in response to a change in the position of the component relative to the further component.

Preferably, the appliance is arranged to control the position so as to maintain an orientation and/or position relative to the further component.

According to another aspect of the present invention, there is disclosed an appliance, comprising:

a component having a user interface; and a further component;

wherein the appliance is arranged to control a position of the user interface relative to the component in dependence on a change in the position of the component so as to control a position of the user interface relative to the further component.

This can enable the user interface to control its position relative to a fixed component of the appliance, such as a base of the appliance. The user of the appliance may remain in a constant position relative to the base, so that controlling the user interface relative to the base is appropriate to control the user interface relative to the user.

Optionally, the component is arranged to rotate and/or translate relative to the further component. Preferably, the component is arranged to rotate such that an end of the component moves directly away from the further component Optionally, the component and the further component are connected, preferably wherein the connection comprises a hinge.

Optionally, the component and the further component are connected. Preferably the component and the further component are connected by a hinge.

Optionally, the component is arranged to rotate relative to the further component, preferably wherein the component is able to rotate such that an end of the component moves directly away from the further component.

Preferably, the further component is a stand and/or pedestal of the appliance.

Optionally, the component is a head of the appliance; wherein the component is arranged to support a tool; and/or wherein the component is arranged to support a driveable tool.

Optionally, the appliance is arranged to enable or prevent operation of a tool and/or a heating element based on the position of the component. Optionally, the appliance is arranged to enable or prevent operation of a tool and/or a heating element based on the position of the component relative to a/the further component.

Optionally, the appliance further comprises a locking mechanism arranged to prevent selectively movement of the component. Preferably, the locking mechanism is arranged to secure the component in at least one of: an/the open position and a/the closed position.

Optionally, the appliance further comprises at least one of:

a closing resilient element arranged to bias the component towards a/the closed position;

an opening resilient element arranged to bias the component towards an/the open position; and a separating resilient element arranged to urge the component and a/the further component away from a parallel orientation.

Preferably, the user interface comprises at least one of: a display, a touchscreen display, a dial, and a button.

Optionally, the appliance comprises a controller, the controller being arranged to control the feature of the user interface. The controller may comprise a processor.

The appliance may be a kitchen appliance, preferably a stand mixer.

According to another aspect of the present invention, there is disclosed a method of changing the position of a user interface, the method comprising:

providing an appliance comprising a component, the component having a user interface;

controlling a feature of the user interface in dependence on a change in a position of the component.

As used herein, "position" preferably connotes a location and/or orientation of a component. Position may refer to a translational position that can be defined using a set of axes (e.g. an x axis, a y axis and a z axis) and/or may refer to a rotational position that can be defined by defining a rotational angle about an axis (e.g. a pitch angle, a yaw angle and a roll angle). Typically a position is defined using an x-value, a y-value, a z-value, a pitch angle, a yaw angle, and a roll angle. A change in position preferably connotes a change in one or more of these values—e.g. a change in a pitch angle is a change in position, even if the x-value, y-value and z-value of the component remain constant.

As used herein, "user interface" preferably connotes a component for receiving user input or outputting information to a user. A user interface may, for example, comprise a display, an input mechanism, such as a button or a dial or a speaker. A user interface may be arranged to both receive input and output information, e.g. a user interface may comprise a touchscreen.

As used herein, "automatically" preferably connotes an action that occurs without direct manual input from a user. Automatically may connote an action that occurs using a processor, such as a change in an electronic display or may connote a mechanical action, such as rotation around a bearing.

FIGURES

Figure 1:
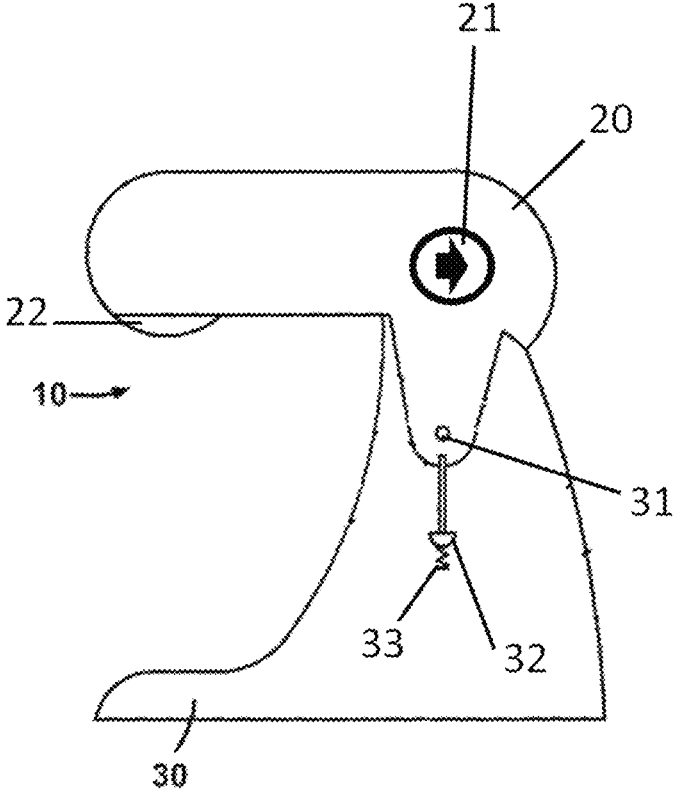
FIG. 1 shows, in a side-on schematic view, a stand mixer with its head in a lowered position.
Figure 8A:
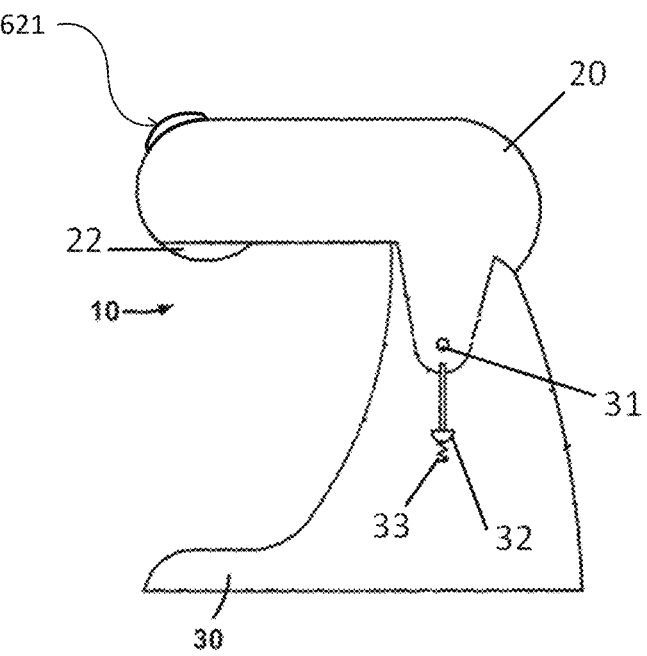
Figure 8B:
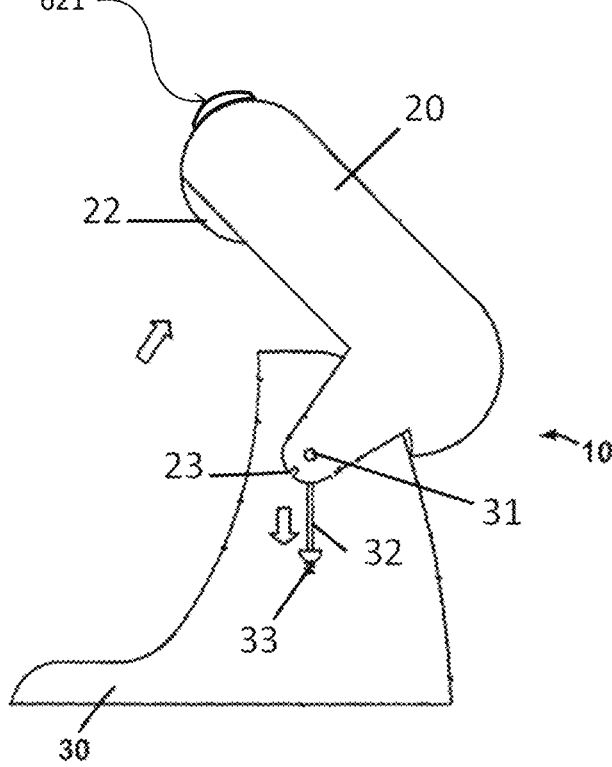

FIGS. 5a-d show a rotating tool comprising a user interface;

FIGS. 6a and 6b show two relatively moveable components, one of which comprises a user interface;

FIGS. 7a and 7b show a further two relatively moveable components, one of which comprises a user interface;

FIGS. 8a and 8b show an embodiment of the stand mixer of FIG. 1 with a user interface located at a distal end of a head of the stand mixer; and FIG. 9 shows a user interface with a plurality of displays.

DETAILED DESCRIPTION

Figure 2:
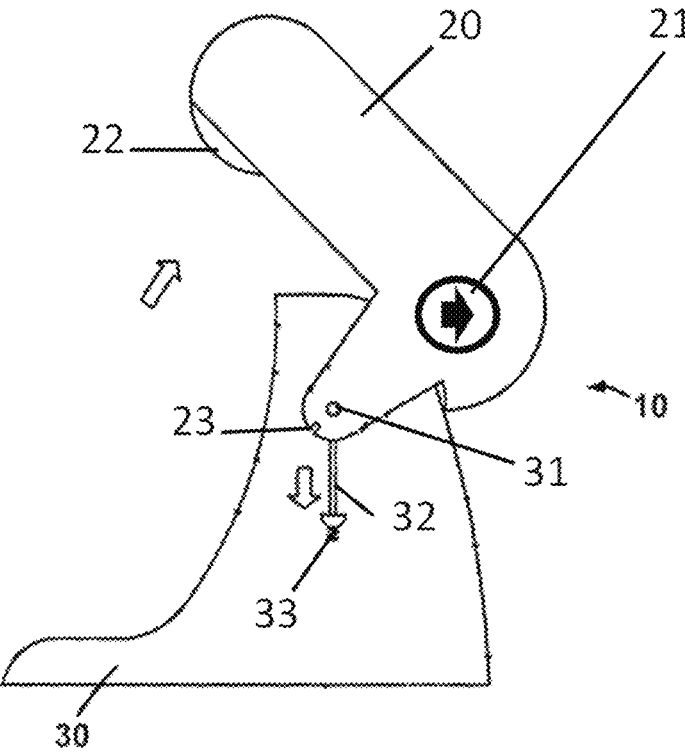
FIG. 2 shows the stand mixer of FIG. 1 with its head in a raised position.

Referring now to FIGS. 1 and 2, in which corresponding features carry the same reference numbers, a stand mixer 10 comprises a generally C-shaped casing comprising a base (or pedestal) 30 which can support a bowl (not shown), and a head 20, linked to the pedestal 30 via a hinge 31. The stand mixer 10 encloses an electric drive motor (which is not shown but can be located anywhere in the device) and gearing (not shown) which conveys the motive power supplied by the motor to one or more drive outlets 22 to which various tools (e.g. whisks, beaters, blenders, slicers, dicers, grinders etc.) can be attached to perform a wide variety of tasks in the kitchen.

The head 20 of the stand mixer 10 comprises a user interface 21 for controlling the functions of the stand-mixer. The user interface 21 is typically located on the side of the appliance, one side of which in most kitchen appliance/stand mixer configurations will be directly facing the user whilst the appliance is being operated. As stand-mixers are typically placed on a counter worktop, below eye-level, the user interface 21 is placed in the upper portion of the appliance so that viewing angles are minimised as much as possible and the user interface may be easily viewed by the user.

The user interface 21 may display feedback from sensors that are typically electronic—for example, feedback from sensors associated with the bowl, pedestal, appliance, and/or other component or aspect, including speed sensors, weight sensors, temperature sensors, strain sensors, torque gauges, chemical sensors, light sensors, and other sensors. These sensors may be electronic sensors. The user interface 21 may also display other information—for example, instructions to the user on how to attach and detach tools and other attachments for the appliance, how and when to clean or service the appliance, recipe instructions, and other such useful information. The user interface 21 may also receive input from the user—for example, commands which determine the operation of the appliance, including desired speeds of operation and heating or cooling temperatures to be achieved.

As shown by the arrow in the user interface 21 in FIG. 1, when the head 20 of the stand mixer 10 is in a lowered position, the user interface 21 is oriented so as to display information horizontally (for example, parallel to the surface on which the stand mixer is placed), so that, for example, writing, extends along a horizontal line (or multiple parallel horizontal lines) and is easy for the user to read. Similarly, user-interface elements configured for receiving user commands such as temperature and motor-speed control-buttons also extend horizontally so that their labels are easy to read.

When the head 20 is in a lowered position, it is locked at this orientation against the urging of a head-spring (not shown) by a push-rod 32 extending from the pedestal 30 into a notch 23 of the head 20. The push-rod 32 is urged into engagement with the notch 23 by a spring 33, but may be lowered using a handle or switch (not shown) so as to remove the push-rod from the notch 23 and permit the head 20 to rotate about the hinge 31 to a raised position above the pedestal 30 under the influence of the head-spring.

As is shown in FIG. 2, when the head 20 rotates about the hinge 31 to a raised position above the pedestal 30, the user interface 21 has been rotated relative to the head 20 so as to remain horizontal relative to the surface on which the stand mixer 10 is placed. In this way the user interface 21 remains easily readable by the user.

Rotation of the user interface 21 is typically achieved by a sensor (not shown) in electronic communication with the user interface detecting movement of the push-rod 32 when the head 20 is to be moved from the lowered position to the raised position, or from the raised position back to the lowered position. This sensor may be a micro-switch, electrical contact, accelerometer, magnet/reed-switch arrangement, or similar sensor for detecting that the push-rod 32 has moved. Since this sensor is sensing the locking/unlocking of the head 20 (or, indeed, whether the head is locked or unlocked), it is effectively functioning as a motion sensor of the head 20 because the unlocking of the head 20 by withdrawing the push-rod 32 from the notch 33 frees the head 20 to rotate.

In some embodiments, rotation of the user interface 21 is achieved by a mechanical arrangement, such as a freely rotating bearing that is weighted at the bottom so that as the head 20 rotates relative to the pedestal 30, the user interface 21 remains in a substantially constant position, and a substantially constant position relative to the pedestal 30.

Typically, stand mixers include means for detecting a lowered state of the head 20 of the stand mixer 10 for use in an interlock arrangement configured to prevent operation of the motor or heating elements associated with the bowl when the head 20 is in a raised position, as such operation may be dangerous to the user. In a preferred embodiment, feedback from the detection means is used to control the orientation of the user interface 21 relative to the head 20. This avoids the need for a separate sensor for controlling the rotation of the user interface relative to the head 20. However, if desired, a separate sensor for controlling rotation of the user interface responsive to changes in the orientation of the head 20 may be included in an appliance.

While the user interface 21 is described here as rotating, more generally the appliance (e.g. the stand mixer 10) is arranged to control a feature of the user interface, such as a position. Typically, this involves the appliance changing the position by rotating the user interface 21 relative to the head 20; equally, the appliance may control the user interface 21 to translate or remain in a constant position in response to a movement of the head 20. The appliance may also be arranged to activate or deactivate one or more sections of the user interface 21.

Figure 3A:
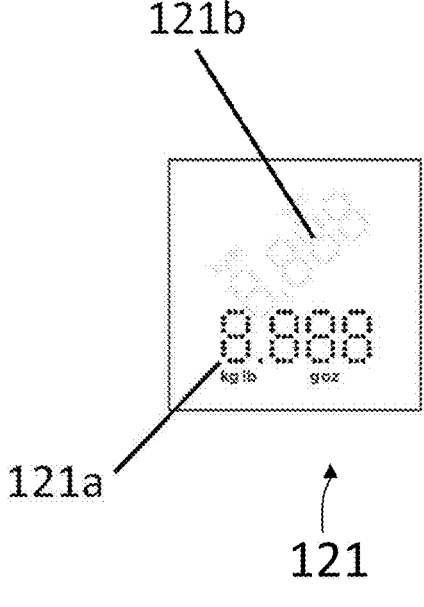
FIGS. 3a and 3b show schematically a user interface suitable for use in an appliance such as the stand mixer of FIG. 1.
Figure 3B:
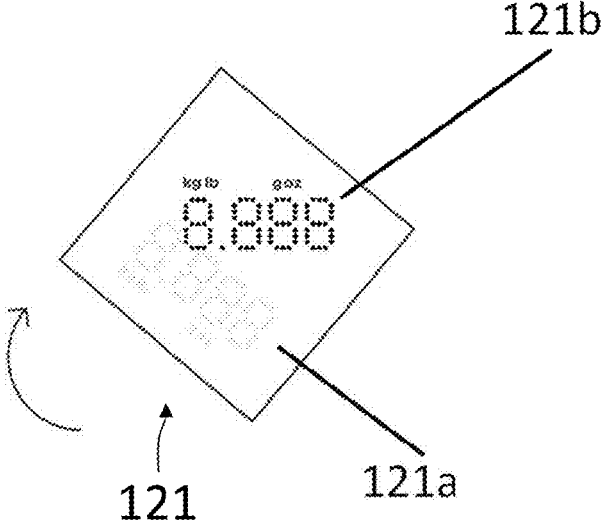

An example of how to achieve rotation of an exemplary user interface 121 for use with an appliance such as a stand mixer 10 is shown in FIGS. 3a and 3b. The user interface 121 includes two separate LED (Light emitting diode) type displays. The first display 121a is oriented relative to the head 20 so as to extend horizontally when the head 20 is in a lowered position. The second display 121b is oriented relative to the head 20 so as to extend horizontally when the head 20 is in a raised position. For example, the display 121b may be oriented relative to the head 20 so as to be horizontal when the head 20 is oriented at an angle of 40 degrees (i.e., the typical angle relative to the horizontal of a stand-mixer head in a fully raised position).

When the head 20 is located in the lowered position, the second display 121b is not active and the first display 121a is active, as shown in FIG. 3a. When the head 20 is in the raised position, the first display 121a is not active and the second display 121b is active, as shown in FIG. 3b. As a result, information on user interface 121 extends horizontally when the head is in the lowered position and when the head is in the raised position, and the user interface information is easy for the user to read in both the lowered and raised position.

The activation and deactivation of the first and second display may be responsive to the above-discussed sensor-feedback regarding the orientation of the head 20. For example, the appliance may be configured such that a first display 121a is active and a second display 121b is not active when the head is in a first position, and such that the first display 121a is not active and the second display 121b is active when the head is in a second position. The appliance may be configured to activate the first display 121a and deactivate the second display 121b responsive to feedback from a sensor indicating that the head 20 is in a first position (or, alternatively, that the head 20 is not in a second position). In particular, the appliance may be configured such that when feedback from a sensor indicates that the head 20 is located in the lowered position, the second display 121b is not active and the first display 121a is active. The appliance may be configured such that when a sensor indicates that the head 20 is located in the raised position (or, perhaps, that the head 20 is not located in the lower position) the first display 121a is not active and the second display 121b is active.

The user interface 121 may comprise more than two displays. For example, the user interface may comprise three displays, with one display corresponding to a lowered position of the head 20, one display corresponding to a fully raised position of the head 20, and an intermediate display corresponding to an intermediate position of the head 20 between the head's fully raised position and its lowered position.

An 'active' display is a display on which a first component of the user interface is being displayed. A display which is 'not active' is a display on which the first component of the user interface is not being displayed. A display is 'deactivated' when it is switched from being 'active' to being 'not active'. A display is 'activated' when it is switched from being 'not active' to 'active'.

In some embodiments, the user interface 221 is arranged to deactivate a certain display and activate a different display in dependence on a change in the position of the head 20. This effectively results in a change of the position of the user interface 221 as it results in a display in a different position being readable by the user.

Figure 4A:
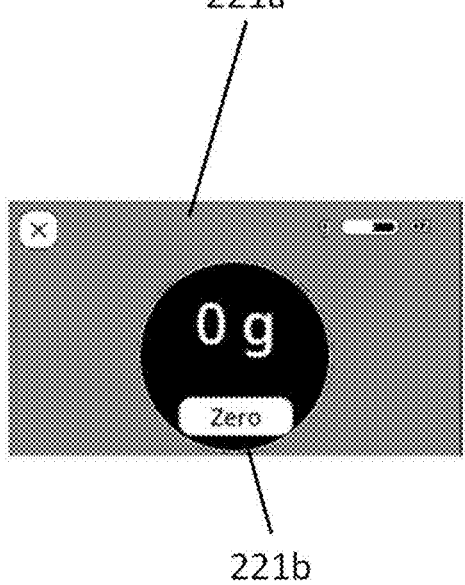
FIGS. 4a and 4b show schematically an alternative user interface suitable for use in an appliance such as the stand mixer of FIG. 1.
Figure 4B:
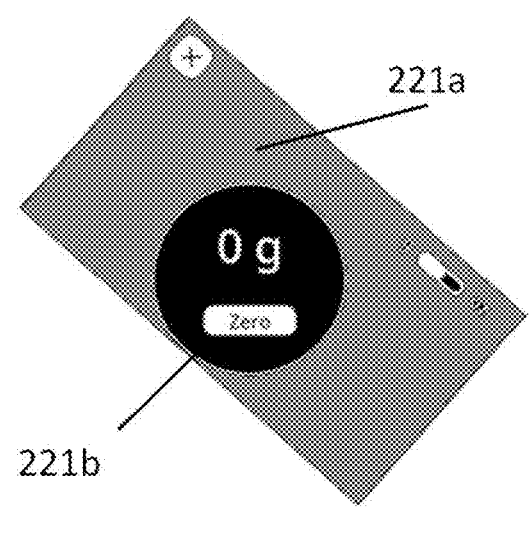

Another example of how to achieve rotation of an exemplary user interface 221 for use with an appliance such as a stand mixer 10 is shown in FIGS. 4a and 4b. The user interface 221 comprises a display, such as a TFT (thin film transistor) touch-screen interface, having a non-rotating area 221a and a rotating area 221b. When movement of the head 20 and/or releasing of the locking of the head 20 is detected, the rotating area 221b is rotated relative to the non-rotating area 221a so that the portion of the user interface within the rotating area 221b remains oriented horizontally. User-interface elements (i.e., buttons or text) within the rotating area 221b remain at the same orientation relative to the pedestal 30 that they were in when the head 20 was in the lowered position.

The rotation of the rotating area 221b between two positions may be automatic—for example, the appliance may be configured such that when the appliance detects that the head 20 is unlocked and freed to rotate under the impetus of the head-spring, the appliance automatically orients the rotating area 221b at the appropriate angle for the portion of the user interface within the rotating area 221b to be horizontal once the head 20 is fully raised. In another example, the appliance may be configured such that when the appliance detects that the head 20 is not in a fully raised position, the appliance automatically orients the rotating area 221*b* at the appropriate angle for the portion of the user interface within the rotating area 221*b* to be horizontal once the head 20 is in the lowered position.

The rotation of rotating area 221*b* may be responsive to feedback from an orientation sensor sensing the orientation of the head 20, such that the user interface within the rotating area 221*b* remains horizontal throughout at least a portion of the travel of the head 20 between the lowered and raised positions. The rotation of the rotating area 221*b* may be animated between two positions so that the user has the impression of continuous rotation without the requirement for an orientation sensor capable of sensing every possible rotational position of the head 20. For example, a sensor signal may indicate a number of different orientations of the head, and for each orientation the user interface may be oriented accordingly. As the head moves between these positions, rotation of the rotating area 221*b* may be animated.

The number of orientations indicated by the sensor may be selected to ensure that the orientation of the rotating area 221*b* remains in a certain range. Typically, this comprises the sensor being arranged to indicate orientations at multiples of 5 degrees so that the 'error' in the orientation of the sensor is never more than 5 degrees. In practice, for a sensor that is horizontal when the head 20 is in the lowered position, as the head 20 is moved to the fully raised position, the sensor reorients (to be horizontal) after each 5 degree increment of the head 20. It will be appreciated that other increments may be used, e.g. 1 degree or 10 degrees.

The rotation of the rotating area 221*b* between two positions may be continuous, where the rotating area 221*b* rotates, optionally in real time, as the head 20 rotates, so that at any position of the head 20 the orientation of the user interface is constant with respect to the pedestal 30.

The rotation of the rotating area 221*b* between two positions may be discontinuous, where the rotating area 221*b* rotates between a discrete first and second position. In some embodiments, the rotation occurs in response to a trigger signal. The trigger signal that results in the movement between the first and second position may be initiated for example based on the position of the head 20 or based on a locking mechanism being triggered. Typically, the locking mechanism is triggered when the head 20 is moved into a closed position (as in FIG. 1) or an open position (as in FIG. 2) and this triggers movement of the user interface 221 between the first and second positions.

The rotating area 221*b* is preferably circular so that it does not extend into other parts of the user interface 221 as it rotates. The non-rotating area 221*a* may be omitted, in which case the rotating area 221*b* will take up the entirety of the display of user interface 221.

Referring to FIGS. 5*a-d*, there is shown a further example of a head 310 comprising a user interface 321 and a tool 322. As has been described with reference to previous figures, as the tool 322 of the head 310 is rotated, the user interface 321 is arranged to rotate relative to the head 310 such that the user interface 321 remains stationary.

Referring to FIGS. 6*a* and 6*b*, there is shown an example of a stand mixer that comprises a first component 420 and a second component 430 that move relative to each other. Typically, the second component 430 is stationary and the first component 420 is moveable. A user interface 421 is located on the first component 420 and is stationary relative to the second component 430; specifically, as the first component 420 moves, the user interface 421 moves (e.g. translates) relative to the first component 420 so as to be stationary relative to the second component 430.

In practice, as the user operates the stand mixer, the first component 420 moves and the user interface 421 remains stationary from the point of view of the user. The user interface 421 may translate, may rotate, or may both translate and rotate relative to the first component 420.

The user interface 421 remaining stationary relative to the user may comprise the user interface 421 moving or may comprise a display on the user interface moving. For example, where the user interface 421 is a display, the entirety of the display may move along the first component 420 or the display may move with the first component 420 and the portion of the display that is active may change.

Referring to FIGS. 7*a* and 7*b*, there is shown another arrangement of a first component 520 and a second component 530, where a user interface 521 located on the first component 520 remains stationary relative to the second component 530 as the first component 520 moves relative to the second component 530.

Referring to FIGS. 8*a* and 8*b*, there is shown an embodiment of the stand mixer 10 comprising a user interface 621 at the distal end of the head 20 (relative to the hinge 31). In general, there may be provided one or more user interfaces anywhere on the stand mixer 10, where the user interfaces adjust in response to a change in the position of a component of the stand mixer 10.

Figure 9A:
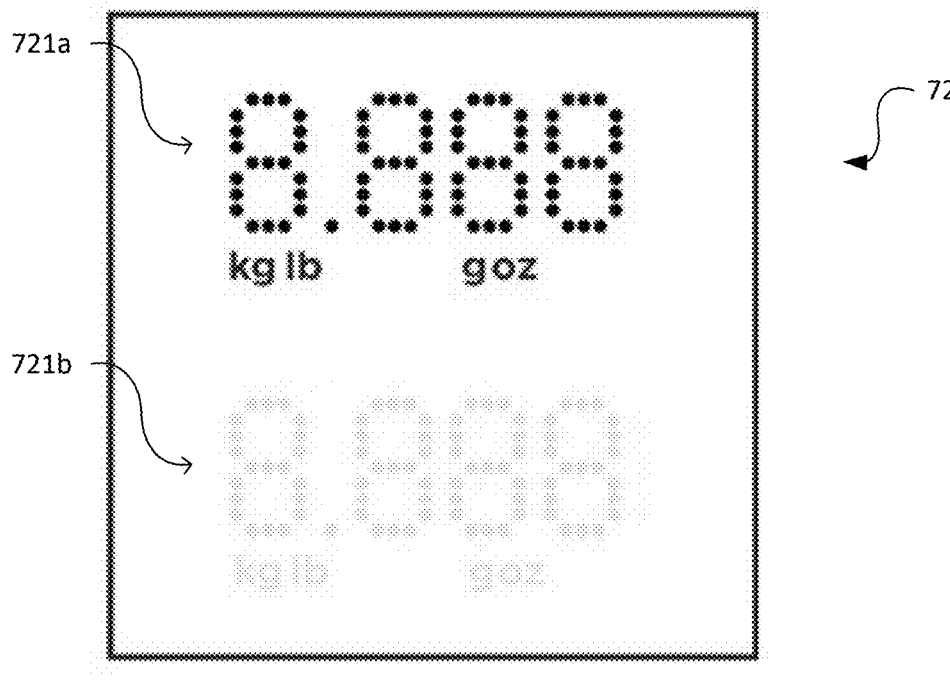
Figure 9B:
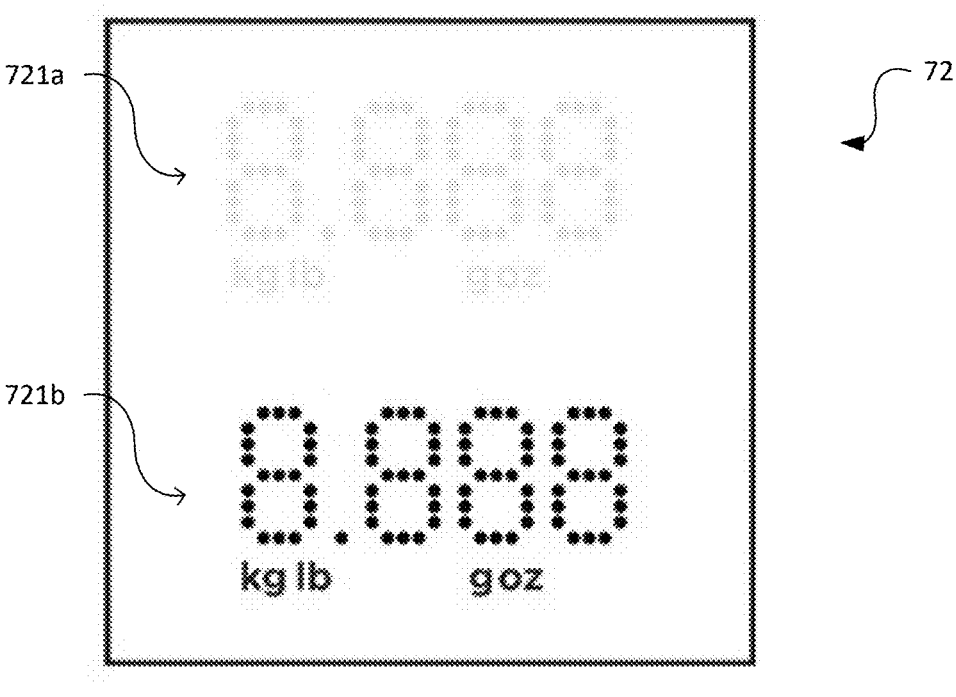

Referring to FIGS. 9*a* and 9*b*, there is shown a user interface 721 comprising a first display 721*a* and a second display 721*b*. Each of the first display 721*a* and the second display 721*b* may be activate or not active. The stand mixer 10 is arranged to activate or deactivate each display in response to a change in the position of a component of the stand mixer 10. In this way, the position of the user interface, e.g. the position of the active display, changes as the position of the component of the stand mixer 10 changes.

The user interface 721 of FIGS. 9*a* and 9*b* is suitable for use with the components of FIGS. 6 and 7, where translation of the components results in the activation of a suitable display.

Alternatives and Modifications

In a further embodiment of the user interface, the user interface may be mechanically rotated so as to maintain a position of the user interface. For example, rotation of the user interface may be driven by an electric motor responsive to an orientation sensor, or it may be driven by gearing linked to the head-lift mechanism such that movement of the head drives rotation of the user interface. In one example, the user interface may be coupled to the appliance using a bearing and fixed, possibly by weighting the user interface, such that the movement of the appliance does not result in movement of the user interface.

Whilst the above-discussed invention is described in relation to a stand-mixer, it may advantageously be implemented into any other appliance; in particular, but not exclusively, the invention may advantageously be implemented in a domestic appliance, in particular a kitchen appliance. Examples of such kitchen appliances include food processors, hand-blenders, blenders, juicers, hand-mixers, kettles, toasters, coffee machines and the like. The invention is particularly useful in any appliance where one element (e.g., an arm) comprising a user interface is movable, perhaps in rotation, relative to another element (e.g., a base)—for example, sandwich-presses, fryers, trouser presses, vacuum cleaners, and other such appliances.

Whilst Roman script written left-to-right is depicted as being used in the user-interface, other writing systems written either right-to-left (e.g. Arabic) and top-down (e.g. Chinese in certain circumstances), or in another direction, may also be used, and would be kept at the appropriate orientation in order to maximise legibility. Though the invention has been described in relation to a horizontally-oriented head being moved to a raised position, it can also be applied to user interfaces on other elements, such as vertically-oriented elements, that are moved to other orientations.

Whilst TFT, LED, and mechanical user interfaces are discussed above, other suitable interfaces may be used. For example LCDs (liquid crystal displays) other than TFT may be used of passive-matrix, active-matrix, and direct-drive types, as well as cathode ray-tubes and other known display technology.

Wherever a component is carrying out an action responsive to sensor feedback or user instructions, suitable processing, electronic communication, and memory resources are provided for this to occur.

Whilst a hinged connection is discussed as permitting relative rotation between the head 20 and the pedestal 30 above, any other way of permitting relative rotation between the two elements may be used. For example a flexible joint (e.g., one made of flexible plastic or fabric), an articulated joint, a ball-joint, or any other rotating joint may be used.

While the detailed description has primarily related to a change in the position of an electronic display, it is equally possible to reorient/move a physical component, such as a button or a dial. In some embodiments, one or more dials or buttons are repositioned in response to a movement of the head 20, where this results in the relative positions of these physical components remaining constant and any text relating to these physical components remaining readable. Where the dimensions of the interface in which the user interface elements are to be displayed are such that the relative positions of user-interface elements cannot be maintained, then these may be re-positioned to different locations so that they are still displayed.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention described here may be used in any appliance, such as a kitchen appliance, and/or as a stand-alone device. This includes any domestic food-processing and/or preparation appliance, including both top-driven appliances (e.g., stand-mixers) and bottom-driven appliances (e.g., food processors). It may be implemented in heated and/or cooled appliances. The invention may also be implemented in both hand-held (e.g., hand blenders) and table-top (e.g., blenders) appliances. It may be used in an appliance that is built-in to a work-top or work surface, or in a stand-alone device. The invention can also be provided as a stand-alone device, whether motor-driven or manually powered.

Whilst the invention has been described in the field of domestic food processing and preparation appliances, it can also be implemented in any field of use where efficient, effective and convenient preparation and/or processing of material is desired, either on an industrial scale and/or in small amounts. The field of use includes the preparation and/or processing of: chemicals; pharmaceuticals; paints; building materials; clothing materials; agricultural and/or veterinary feeds and/or treatments, including fertilisers, grain and other agricultural and/or veterinary products; oils; fuels; dyes; cosmetics; plastics; tars; finishes; waxes; varnishes; beverages; medical and/or biological research materials; solders; alloys; effluent; and/or other substances. Any reference to "food", "beverage" (or similar language) herein may be replaced by such working mediums.

The invention claimed is:

1. An appliance, comprising:
   a component having a user interface;
   a further component, the component being rotatable relative to the further component and at least one of:
   a locking mechanism configured to selectively prevent rotation of the component relative to the further component; and
   an interlock arrangement configured to prevent operation of the appliance unless the component is in a predetermined position relative to the further component;
   wherein the appliance is arranged to rotate the user interface in dependence on a trigger signal indicating a change in a position of the component relative to the further component in order to maintain an orientation of the user interface relative to the further component;
   wherein the trigger signal is initiated based on at least one of: the locking mechanism being operated; and the interlock arrangement being operated.

2. The appliance of claim 1, wherein the appliance is arranged to control at least one of a position of the user interface, a location of the user interface, and an orientation of the user interface relative to the component.

3. The appliance according to claim 1, wherein the appliance is arranged to control a position of the user interface as the component moves and/or wherein the appliance is arranged to control the position of the user interface at or after movement of the component.

4. The appliance according to claim 1, wherein the appliance is arranged to control a position of the user interface automatically in response to the change in the position of the component and/or wherein the appliance is arranged to control the position of the user interface based on a previous position of the user interface.

5. The appliance according to claim 1, further comprising a sensor arranged to detect a position of and/or a movement of the component, wherein the appliance is arranged to control a position of the user interface in response to a signal from the sensor.

6. The appliance according to claim 1, wherein the component is arranged to rotate between an open position and a closed position, wherein each of the open position and the closed position are stable positions, and wherein the component is secured in place in at least one of the open position and the closed position.

7. The appliance according to claim 1, wherein the appliance is arranged to control a position of the user interface in dependence on a rotation of the component of one of: less than 60 degrees, less than 40 degrees, less than 30 degrees, and less than 15 degrees.

8. The appliance according to claim 1, wherein one or more sections of the user interface are arranged to activate and/or deactivate in response to a change in the position of the component, wherein the appliance is arranged to activate a section of the user interface in dependence on a position of the component.

9. The appliance according to claim 1, wherein the appliance is arranged to control a position of the user interface so that an orientation of the user interface changes by one of less than 50%, less than 20% and less than 5% of a movement range of the component.

10. The appliance according to claim 1, wherein the appliance is arranged to control a position of the user interface so that an orientation of the user interface changes by one of less than 10 degrees, less than 5 degrees, and less than 1 degree.

11. The appliance according to claim 1, wherein the component is a head of the appliance; wherein the component is arranged to support a tool; and/or wherein the component is arranged to support a driveable tool.

12. The appliance according to claim 1, wherein the appliance is arranged to enable or prevent operation of a tool and/or a heating element based on a position of the component and/or based on the position of the component relative to the further component, the appliance further comprises the locking mechanism arranged to prevent movement of the component, wherein the locking mechanism is arranged to secure the component in at least one of: an open position and a closed position.

13. The appliance according to claim 1, further comprising at least one of:

a closing resilient element arranged to bias the component towards a closed position; and an opening resilient element arranged to bias the component towards an open position.

14. The appliance according to claim 1, wherein the user interface comprises at least one of: a display, a touchscreen display, a dial, and a button.

15. The appliance according to claim 1, being a kitchen appliance, and/or being a stand mixer.

16. The appliance according to claim 1, wherein the appliance is arranged to control a position of the user interface so as to maintain the orientation and/or position relative to the further component.

17. The appliance according to claim 16, wherein the component is arranged to rotate and translate relative to the further component, wherein the component is arranged to rotate such that an end of the component moves directly away from the further component.

18. The appliance according to claim 16, wherein the component and the further component are connected, by a hinge, and/or wherein the further component is a stand and/or pedestal of the appliance.

19. A method of changing the position of a user interface, the method comprising:

providing an appliance comprising a component, having a user interface;

a further component being rotatable relative to the component; and at least one of:

a locking mechanism configured to selectively prevent rotation of the component relative to the further component; and an interlock arrangement configured to prevent operation of the appliance unless the component is in a predetermined position relative to the further component; and rotating the user interface in dependence on a trigger signal indicating a change in a position of the component relative to the further component in order to maintain an orientation of the user interface relative to the further component;

wherein the trigger signal is initiated based on at least one of: the locking mechanism being operated; and the interlock arrangement being operated.

\* \* \* \* \*